United States Patent
Liberatore

(10) Patent No.: US 11,203,542 B2
(45) Date of Patent: Dec. 21, 2021

(54) METHOD FOR SOFTENING LITHIUM BRINE USING NANOFILTRATION

(71) Applicant: BL TECHNOLOGIES, INC., Minnetonka, MN (US)

(72) Inventor: Frederick Liberatore, Carlsbad, CA (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 93 days.

(21) Appl. No.: 16/612,282

(22) PCT Filed: May 11, 2017

(86) PCT No.: PCT/US2017/032178
§ 371 (c)(1),
(2) Date: Nov. 8, 2019

(87) PCT Pub. No.: WO2018/208305
PCT Pub. Date: Nov. 15, 2018

(65) Prior Publication Data
US 2020/0140305 A1    May 7, 2020

(51) Int. Cl.
*B01D 61/02*    (2006.01)
*C02F 1/44*    (2006.01)
(Continued)

(52) U.S. Cl.
CPC .............. *C02F 5/02* (2013.01); *B01D 61/022* (2013.01); *B01D 61/027* (2013.01); *C02F 1/442* (2013.01);
(Continued)

(58) Field of Classification Search
CPC ................ B01D 61/022; B01D 61/027; B01D 2317/02; B01D 2317/025; C02F 1/442; C02F 5/02; C02F 2101/101
See application file for complete search history.

(56) References Cited

U.S. PATENT DOCUMENTS 5,858,240 A    1/1999   Twardowski et al.
6,004,464 A *  12/1999  Lien .......................... B01J 49/50
                                                    210/639

(Continued)

FOREIGN PATENT DOCUMENTS

| CL | 201203478 A1 | 10/2013 |
| CN | 102803148 A | 11/2012 |

(Continued)

OTHER PUBLICATIONS

Chilean Patent Application No. 201801240, Office Action dated Oct. 1, 2019—English Translation Not Available.

(Continued)

*Primary Examiner* — Bradley R Spies

(57) ABSTRACT

Lithium brine is treated with a multiple pass nanofiltration (NF) membrane system. Sulfate is added to permeate from an upstream pass before it flows through a downstream pass. Optionally the sulfate may be added to the permeate by dosing it with sulfuric acid or a slat such as sodium sulfate. The softened brine may then be processed further, for example by a combination of solvent extraction, electrolysis, crystallization and drying, to produce a lithium hydroxide product that can be used to make batteries.

7 Claims, 1 Drawing Sheet

(51) Int. Cl.
*C02F 101/10* (2006.01)
*C02F 5/02* (2006.01)
*C02F 103/08* (2006.01)

(52) U.S. Cl.
CPC .. *B01D 2317/025* (2013.01); *C02F 2101/101* (2013.01); *C02F 2103/08* (2013.01)

(56) References Cited

U.S. PATENT DOCUMENTS

| | | | |
|---|---|---|---|
| 6,113,797 A * | 9/2000 | Al-Samadi | B01D 61/022 210/650 |
| 6,461,514 B1 | 10/2002 | Al-Samadi | |
| 8,641,992 B2 | 2/2014 | Galli et al. | |
| 8,647,509 B2 | 2/2014 | Vora et al. | |
| 8,679,347 B2 | 3/2014 | Al-Samadi | |
| 9,199,866 B2 | 12/2015 | Al-Samadi | |
| 2011/0300041 A1 | 12/2011 | Galli et al. | |
| 2014/0042029 A1 | 2/2014 | Wallace | |
| 2015/0344341 A1 | 12/2015 | Wallace | |

FOREIGN PATENT DOCUMENTS

| | | |
|---|---|---|
| CN | 103074502 A | 5/2013 |
| CN | 105293803 A | 2/2016 |
| GB | 2395946 A | 6/2004 |
| KR | 20150139486 A | 12/2015 |
| WO | 2013065050 A1 | 5/2013 |
| WO | 2014089796 A1 | 6/2014 |
| WO | 2015177705 A1 | 11/2015 |
| WO | WO-2017039724 A1 * | 3/2017 ........ B01J 20/28057 |

OTHER PUBLICATIONS

Chinese Patent Application No. 201780090579.7, Office Action dated May 19, 2021—English Translation Available.

International Patent Application No. PCT/US2017/032178, International Search Report and Written Opinion dated Dec. 5, 2017.

International Patent Application No. PCT/US2017/032178, International Preliminary Report on Patentability dated Nov. 21, 2019.

Nanda, Dipankar et al., "Effect of solution chemistry on water softening using charged nanofiltration membranes", Desalination, vol. 234, Issues 1-3, Dec. 31, 2008, pp. 344-353.

Bouchoux, Antoine et al., "Investigation of nanofiltration as a purification step for lactic acid production processes based on conventional and bipolar electrodialysis operations", Separation and Purification Technology, Dec. 2006, vol. 52 Issue: 2, p. 266-273.

* cited by examiner

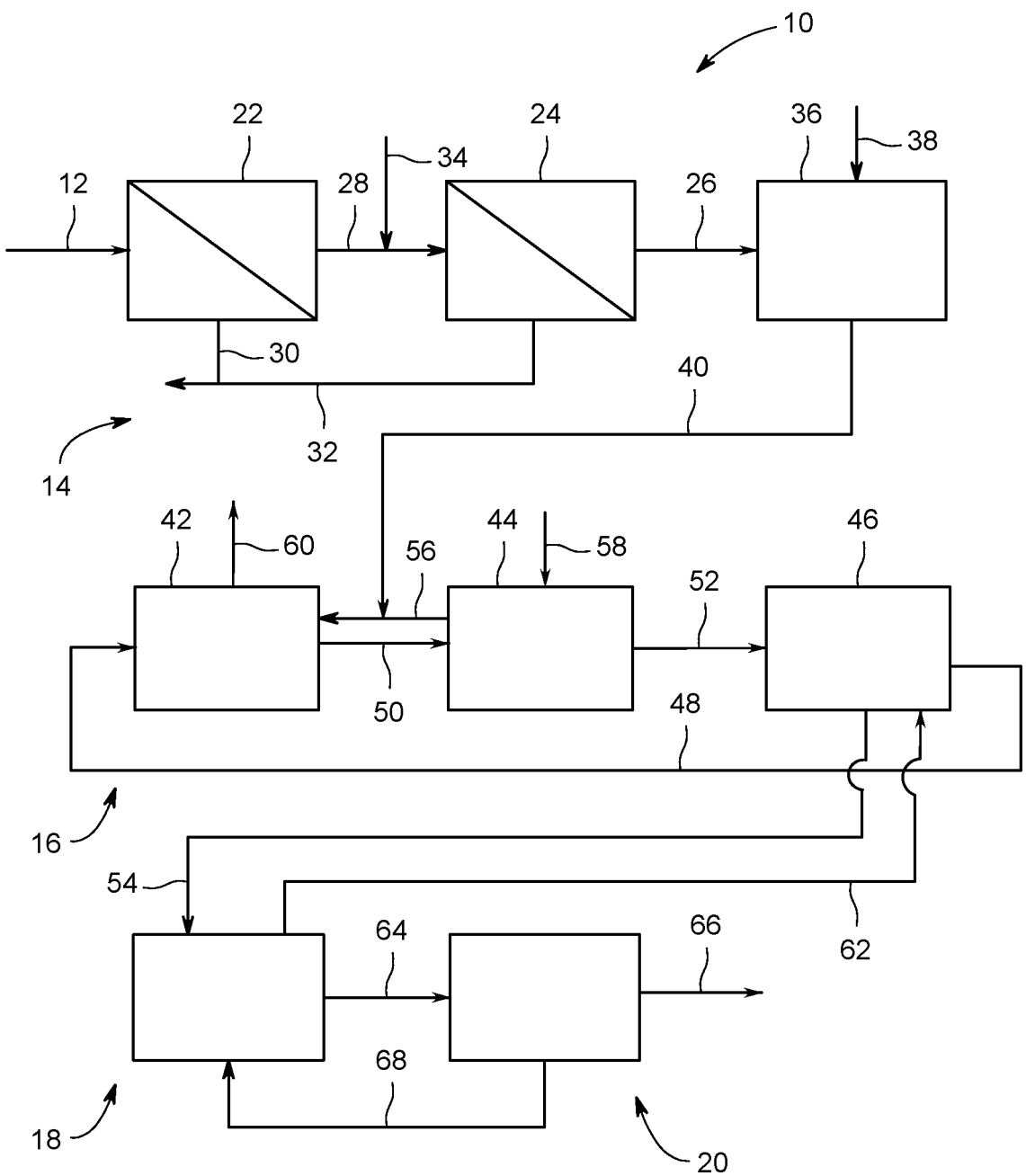

METHOD FOR SOFTENING LITHIUM BRINE USING NANOFILTRATION

CROSS-REFERENCE TO RELATED APPLICATIONS

This application is a National Stage Entry of International Application No. PCT/US2017/032178, filed May 11, 2017.

FIELD

This specification relates to membrane separation process and to softening brine, in particular lithium brine.

BACKGROUND

Lithium is used, for example, in making lithium-ion batteries. About one half of the world's lithium is extracted from subsurface brines. The brine may have a lithium concentration of about 100 to 1,400 mg/L, or more. Current commercial brine extraction processes typically use evaporation in large ponds followed by leaching or absorption to extract the lithium from the brine. The complete process requires over a year and recovers only about 60% of the lithium in the brine.

Other methods of extracting lithium include, for example, solvent extraction. A solvent extraction process is described in International Publication Number WO 2013/065050, Process for Metal Ions Removal From Aqueous Solutions. Solvent extraction systems for use with lithium brines are sold by Tenova Bateman Technologies under the trademark LISX. The brine is softened to remove calcium and magnesium ions prior to solvent extraction. The solvent extraction process then produces a lithium chloride solution. The lithium chloride solution is later converted into a lithium hydroxide or solution by electrolysis. A crystallizer is then used to concentrate the lithium hydroxide to produce a lithium hydroxide hydrate that may be used to make batteries.

Lithium brine can be softened by ion exchange. Alternatively, International Publication Number WO 2015/177705, Selective Separation Process, describes the use of a reverse osmosis membrane at sub-osmotic pressure to retain a portion of the calcium and magnesium ions in brine while allowing most of the lithium ions to pass through to the permeate.

International Publication Number WO 2014/089796, Method for Treating High Strength Wastewater Such as RO Brine, describes a system and method for treating high strength industrial wastewater such as reverse osmosis brine with a nanofiltration membrane unit.

INTRODUCTION

This specification describes a system and method for softening lithium brine. The lithium brine may be mined, i.e. subsurface, brine. The brine may have a lithium concentration of over 100 mg/L and a total dissolved solids (TDS) concentration in the range of 15-35%. After being softened, the brine may be treated further to extract the lithium. For example, the brine may be treated with a combination of solvent extraction, electrolysis, crystallization and drying.

In a process described herein, lithium brine flows through an upstream nanofiltration (NF) membrane unit to produce an upstream permeate. Sulfate is added to the upstream permeate. Optionally the sulfate may be added to the upstream permeate by dosing it with sulfuric acid or a salt such as sodium sulfate. Then the upstream permeate flows through a downstream NF membrane unit to produce a softened permeate. In at least some cases, the softened permeate may have a concentration of calcium of 20 ppm or less. In at least some cases, the softened permeate may have a concentration of magnesium of 20 ppm or less. In at least some cases, the softened permeate may have a combined combination of calcium and magnesium or a hardness concentration of 20 ppm or less.

A system described herein has a multiple pass nanofiltration (NF) membrane system with a sulfate dosing system.

BRIEF DESCRIPTION OF THE FIGURES

FIG. 1 shows a schematic process flow diagram of a lithium brine treatment system.

DETAILED DESCRIPTION

FIG. 1 shows a lithium brine treatment system 10 for treating lithium brine 12. The lithium brine 12 may have one or more of: a lithium concentration of over 100 mg/L; a sodium concentration of over 20,000 mg/L; a sulfate concentration of 5,000 mg/L or more; and a combined calcium and magnesium concentration of 1000 mg/L or more. The treatment system 10 has a softening section 14, a solvent extraction section 16, an electrolysis section 18 and a crystallization and drying section 20.

The softening section 14 has an upstream nanofiltration membrane unit (NF unit) 22 and a downstream NF unit 24. Optionally, there could be additional NF units in series or in parallel with one or both of the upstream NF unit 22 or the downstream NF unit 24. Each NF unit 22, 24 could have multiple NF membrane modules. Examples of suitable NF modules include DK and DL modules from Osmonics or similar. The modules may have, for example, flat sheet or spiral wound membranes. The lithium brine 12 is optionally pretreated before reaching the softening section, for example by way of filtration to remove suspended solids.

The lithium brine 12 passes through the NF units 22, 24 in a multiple pass, or series configuration, in which the lithium brine 12 is permeated at least twice to produce softened brine 26. A first permeate 28 leaves the permeate side of the upstream NF unit 22 and is fed to the downstream NF unit 24. The upstream NF unit 22 produces upstream retentate 30 and the downstream NF unit 24 produces downstream retentate 32. The retentate 30, 32 contains most of the cacicium and magnesium ions present in the lithium brine 12 as well as other rejected ions. The retentate 30, 32 may be processed further to recover additional components or it may be discharged. For example the retentate 30, 32 may by pumped back into the salar that the lithium brine was drawn from or crystalized.

NF membranes primarily reject multivalent ions. Accordingly, softened brine 26 still has most of the lithium that was present in the lithium brine 12. The recovery of permeate relative to feedwater may be 80 to 95% in each pass.

Although NF membranes reject divalent ions, they may be more selective for anions than for cations. In particular, proportionally more sulfate ion ($SO4^2$) is rejected than $Ca^{2+}$ and $Mg^{2+}$ ions. Rejection of divalent cations decreases further when the feedwater is low in divalent anions. Without intending to be limited by theory, the preferential rejection of divalent anions may encourage the rejection of divalent cations by electrostatic attraction when there is a sufficient concentration of divalent anions in the feedwater.

In general, the hardness removal of an NF membrane can vary with the composition of the feedwater.

The lithium brine 12 tends to have a higher concentration of sulfate than of magnesium and calcium combined. Accordingly, first permeate 28 has significantly reduced hardness relative to lithium brine 12. However, first permeate 28 is reduced in sulfate to an even greater extent. If first permeate 28 is fed unaltered to second NF unit 24 it is unlikely to produce a second permeate softened to a desired level.

To increase harness rejection in the second NF unit 24, sulfate 34 is added to first permeate 28. The sulfate may be provided, for example, in an aqueous solution of sodium sulfate or sulfuric acid. The hardness removal efficiency of the second NF unit 24 may be increased to 98% or more. Sulfate is added to the first permeate 28 in an amount sufficient to make the molar concentration of sulfate ions approximately equal to, for example at least 70% or more of, the sum of the molar concentrations of $Ca^{2+}$ and $Mg^{2+}$ ions. Providing a higher sulfate concentration, for example approaching a 1:1 molar ratio of sulfate and hardness ions, provides limited improvement with high TDS water such as lithium brine. Good hardness rejection can be achieved with less sulfate consumption when processing lithium brine by dosing sulfate such that the molar concentration of sulfate ions is at least 70% but less than 80% of sum of the molar concentrations of $Ca^{2+}$ and $Mg^{2+}$ ions. The resulting softened brine 26 may have concentrations of calcium or magnesium or both of 20 ppm or less. Softened brine 26 may also have a combined combination of calcium and magnesium, or a hardness concentration, of 20 ppm or less.

Optionally, the softened brine 26 may be further treated in a polishing unit 36. The polishing unit 36 may be a lime or soda softener. In this case, the polishing unit 36 includes a mixing tank for receiving the softened brine 26. A precipitant 38, for example soda (sodium carbonate, $Na_2CO_3$), lime (calcium hydroxide $Ca(OH)_2$), or a combination of lime or soda and NaOH, are dosed into the tank and mixed with the softened brine 26. NaOH is used if required to produce a pH of about 10-11 in the polishing unit 36. Soda is preferred over lime. In the polishing unit 36, the precipitant 38 reacts with hardness in the softened brine 26 to produce precipitates comprising calcium carbonate. The precipitates are separated out to produce polished brine 40. For example, precipitates may be filtered out with a microfilter with a pore size of about 10 microns or less, preferably 2 microns of less.

The polished brine 40 is sent to the solvent extraction section 16. The solvent extraction section 16 has a lithium extraction unit 42, a scrubbing unit 44 and a stripping unit 46. Solvent recirculates through these three units. Stripped solvent 48 recirculates from the stripping unit 46 to the lithium extraction unit 42. Loaded solvent 50 is produced in the lithium extraction unit 42 and flows to the scrubbing unit 44. Purified solvent 52 flows from the scrubbing unit 44 to the stripping unit 46. A scrub solution 58 is added to the scrubbing unit 44. In the example shown, the polished brine 40 is mixed with spent scrub 56 flowing from the scrubbing unit 44 to the lithium extraction unit 42. Raffinate 60 is withdrawn from the lithium extraction unit 42. The stripping unit 46 discharges lithium chloride solution 54. Optionally, the solvent extraction section 16 may be a commercial system sold by Tenova Bateman Technologies under the LISX trade mark.

The lithium chloride solution 54 flows to the electrolysis section 18. Hydrogen sulfate solution 62 flows from the electrolysis section 18 back to the stripping unit 46 of the solvent extraction section 16. Lithium hydroxide 64 is produced by electrolysis and flows to the crystallization and drying section 20. The crystallization and drying section produces lithium hydroxide hydrate 66 and water 68. The water 68 is returned to the electrolysis section 18. The lithium hydroxide hydrate 66 is a product useful in making lithium ion batteries. Optionally, the electrolysis section 18 and the crystallization and drying section 20 may be a commercial system sold by Tenova Bateman Technologies under the LIEL trade mark.

Example

An exemplary multiple pass nanofiltration system was modeled. Feed water was assumed to have the following concentrations of calcium, magnesium, sulfate and lithium as follows: 121, 3907, 6051, and 354 mg/l respectively. The feed water also had other components, for example 89026 mg/L of sodium, to be representative of a lithium brine mined in Chile. The first pass permeate had concentrations of calcium, magnesium, sulfate and lithium as follows: 31, 467, 91 and 354 mg/l. The second pass was modeled with and without sulfate added to the first pass permeate. Without sulfate added, the second pass permeate had concentrations of calcium, magnesium, sulfate and lithium as follows: 7.71, 80.42, 1.14, 354 mg/I. With 1550 mg/L sulfate added to the first pass permeate, the second pass permeate had concentrations of calcium, magnesium, sulfate and lithium as follows: 7.96, 18.83, 22.89, and 354 mg/I.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A lithium brine treatment system comprising,
   a) a upstream nanofiltration membrane unit;
   b) a downstream nanofiltration membrane unit;
   c) a sulfate dosing system; and
   d) a solvent extraction system that includes at least a lithium extraction unit and a stripping unit, where the stripping unit includes a lithium chloride discharge outlet,
   wherein a permeate outlet of the upstream nanofiltration system is connected to a feed inlet of the downstream nanofiltration unit and the sulfate dosing system is connected between the upstream and downstream nanofiltration units.

2. A process for softening lithium brine comprising the steps of,
   a) flowing the lithium brine to a nanofiltration membrane unit to produce a first permeate;
   b) adding sulfate to the first permeate; and,
   c) flowing the first permeate to another nanofiltration membrane unit to produce a softened permeate.

3. The process of claim 2 wherein in step b) an amount of sulfate is added to the first permeate such that a molar concentration of sulfate ions in the first permeate is 70% or more of a sum of the molar concentrations of Ca2+ and Mg2+ ions in the first permeate.

4. The process of claim 2 wherein sulfate is added to the first permeate by adding an aqueous solution of sodium sulfate or sulfuric acid to the first permeate.

5. The process of claim 2 wherein the softened permeate is treated by way of solvent extraction to produce lithium chloride.

6. The process of claim 3 wherein the amount of sulfate is added to the first permeate such that a molar concentration of sulfate ions in the first permeate is less than 80% of a sum of the molar concentrations of $Ca^{2+}$ and $Mg^{2+}$ ions in the first permeate.

7. The process of claim 2 wherein the lithium brine has a total dissolved solids concentration between 15 and 35%.

* * * * *